(12) United States Patent  (10) Patent No.: US 8,668,360 B2
Lin  (45) Date of Patent: Mar. 11, 2014

(54) LIGHT SOURCE SYSTEM

(75) Inventor: Hung-Ying Lin, Taoyuan-Hsien (TW)

(73) Assignee: Delta Electronics, Inc. (TW)

(*) Notice: Subject to any disclaimer, the term of this patent is extended or adjusted under 35 U.S.C. 154(b) by 64 days.

(21) Appl. No.: 13/397,793

(22) Filed: Feb. 16, 2012

(65) Prior Publication Data

US 2013/0088873 A1  Apr. 11, 2013

(30) Foreign Application Priority Data

Oct. 11, 2011 (TW) .............................. 100136636 A

(51) Int. Cl.
*G03B 21/28* (2006.01)
(52) U.S. Cl.
USPC ........................................... 362/293; 353/31
(58) Field of Classification Search
USPC ......................................................... 362/293
See application file for complete search history.

(56) References Cited

U.S. PATENT DOCUMENTS

| 6,144,420 A | 11/2000 | Jung |
| 6,666,557 B1 | 12/2003 | Choi |
| 7,530,693 B2 * | 5/2009 | Mihalakis ........................ 353/31 |
| 7,532,176 B2 * | 5/2009 | Imade ............................. 345/32 |

* cited by examiner

*Primary Examiner* — Anabel Ton
(74) *Attorney, Agent, or Firm* — Cantor Colburn LLP

(57) ABSTRACT

A light source system comprising an illumination component, a color wheel and a light uniformization module is provided. The illumination component is disposed on a first axis to provide light beams. The color wheel defines a second axis to rotate thereabout, wherein the second axis is deflected from the first axis by an angle. The light beams provided from the illumination component are substantially focused at the first axis and onto the color wheel. The light uniformization module is disposed on the first axis after the color wheel to receive a portion of the light beams and uniformize the light beams to travel along the first axis.

9 Claims, 3 Drawing Sheets

LIGHT SOURCE SYSTEM

This application claims the benefit of the priority to Taiwan Patent Application No. 100136636 filed on Oct. 11, 2011, the disclosures of which are incorporated herein by reference in their entirety.

CROSS-REFERENCES TO RELATED APPLICATIONS

Not applicable.

BACKGROUND OF THE INVENTION

1. Field of the Invention

The present invention relates to a light source system for a projection device. More particularly, the present invention relates to a light source system which can prevent the premature failure of a bulb from long-term exposure to reflected light beams.

2. Descriptions of the Related Art

With the progress of science and technology, various display devices have been developed in succession. Among these display devices, projectors have become indispensable electronic products for presenting image information in business conferences or in common audio/video (AV) entertainments because they can change the size of an image depending on the actual service sites.

However, conventionally, in a light source system of the projection device from the prior art, a bulb, a color wheel and a light tunnel are sequentially disposed along the same axis so that light beams emitted by the bulb can be focused onto the color wheel and then be uniformized by the light tunnel. In this way, when the light beams are emitted by the bulb towards the color wheel, most of the light beams pass through the color wheel and the light tunnel to an imaging system, which then projects an image onto a screen.

However, the color wheel in the prior art is disposed perpendicular to an optical axis of the bulb (or a traveling direction of the light beams). In this arrangement, not all of the light beams can pass through the color wheel successfully; and instead, a small portion of the light beams will be reflected by the color wheel back to the bulb or even be focused at a wick of the bulb. After long term use, the bulb might be subjected to a high temperature and intense heat due to the exposure of excessively reflected light beams. This may lead to the premature failure of the bulb and, consequently, the user has to replace the bulb of the projection device frequently.

Accordingly, it is important to provide a solution that can prevent the light beams that fail to pass through the color wheel from being reflected to the bulb and prevent the premature failure of the bulb from the exposure of the reflected light beams.

SUMMARY OF THE INVENTION

An objective of the present invention is to provide a light source system, which can prevent long-term exposure of reflected light beams to a bulb. According to the present invention, a color wheel is deflected by an angle so that a portion of light beams that fail to pass through the color wheel but are reflected will not be projected back towards the bulb; instead the light will be reflected to the outside of the bulb due to the deflection of the color wheel. Thus, premature failure of the bulb can be prevented.

Another objective of the present invention is to provide a light source system, in which a fly eyes lens is further adopted for uniformizing light beams that have passed through the color wheel so that the light beams can travel along a predetermined optical axis. This can further miniaturize the light source system.

To achieve the aforesaid objectives, the present invention provides a light source system, which comprises the following: an illumination component, a color wheel and a light uniformization module. The illumination component is disposed on a first axis to provide light beams. The color wheel defines a second axis to rotate thereabout. The second axis deflects from the first axis by an angle and the light beams provided from the illumination component substantially focus at the first axis and onto the color wheel. The light uniformization module is disposed on the first axis after the color wheel to receive and uniformize a portion of the light beams to travel along the first axis.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following descriptions, the present invention will be explained with reference to embodiments thereof The present invention relates to a light source system. It shall be appreciated that in the following embodiments and the attached drawings, the description of these embodiments is only for the purpose of illustration rather than to limit the present invention. Meanwhile, in the following embodiments and the attached drawings, elements not directly related to the present invention are omitted from depiction; and dimensional relationships among individual elements in the attached drawings are illustrated only for ease of understanding but not to limit the actual scale.

Figure 1:
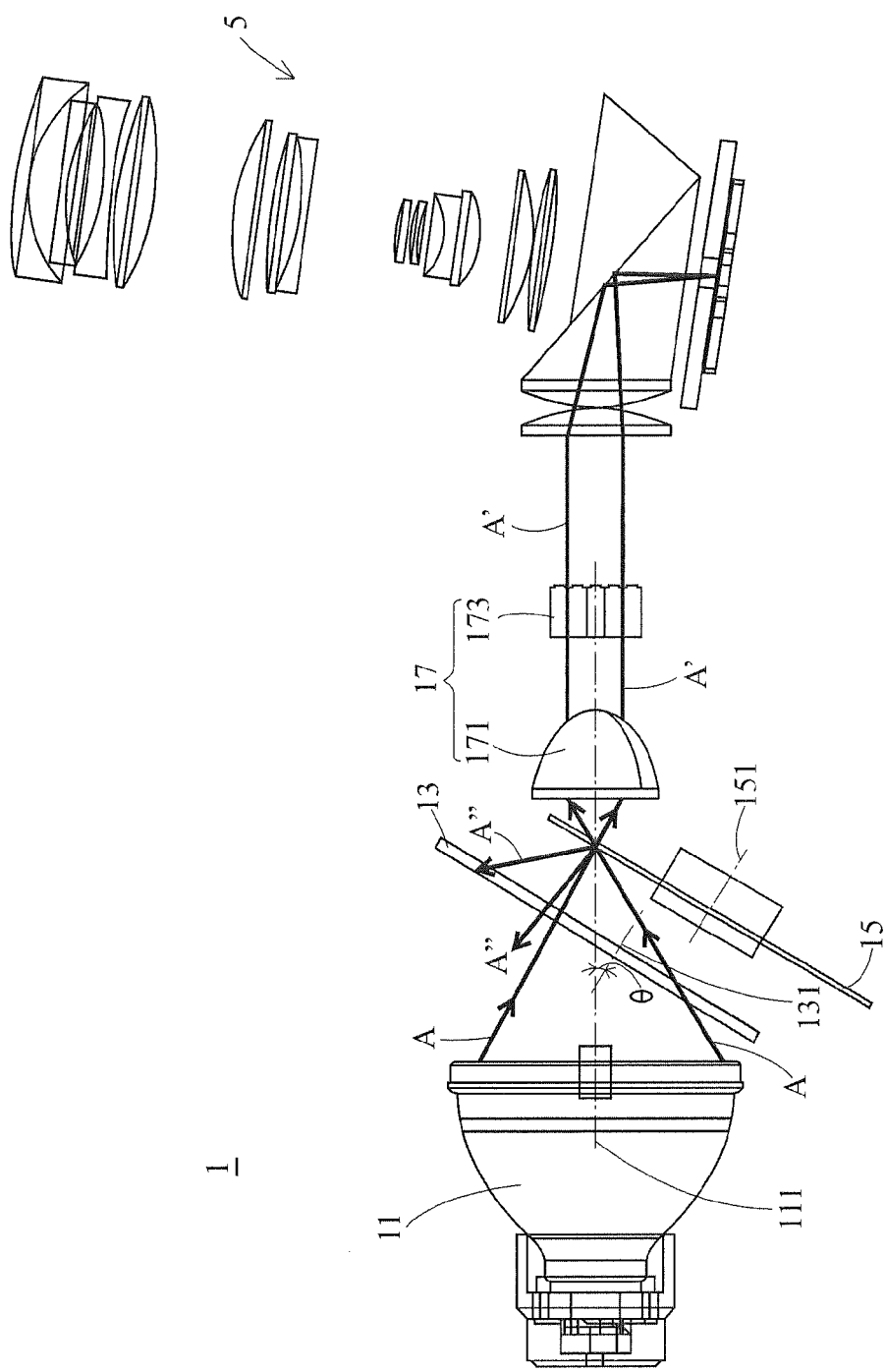
FIG. 1 is a schematic view of a light source system according to the first embodiment of the present invention.

The first embodiment of the present invention is a light source system 1 for a projection device, which is schematically shown in FIG. 1. The projection device comprises a light source system 1 and an imaging system 5. The imaging system 5 comprises, for example, a digital micromirror device, an optical lens, a lens and the like. Light beams provided by the light source system 1 of the projection device are outputted to the imaging system so that the imaging system forms the light beams into a projection frame. The light source system 1 according to the first embodiment of the present invention comprises an illumination component 11, a filter component 13, a color wheel 15 and a light uniformization module 17.

Figure 2:
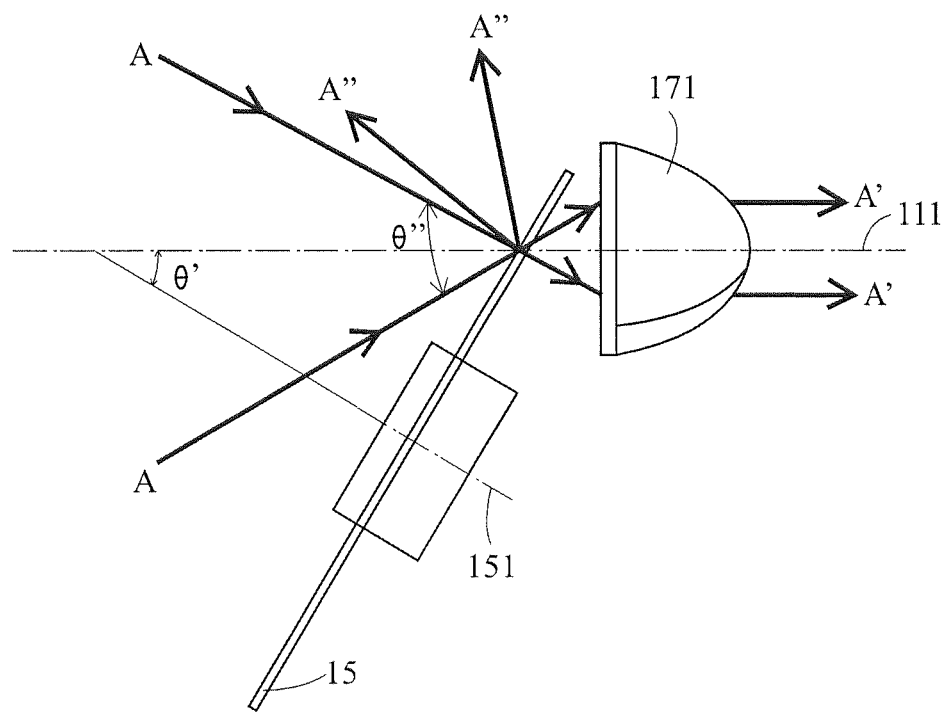
FIG. 2 is a partially enlarged schematic view of the first embodiment of the present invention.

The illumination component 11 is disposed on a first axis 111 to provide light beams A. The first axis 111 shown in FIG. 1 is along a horizontal direction. For convenience of description, the light beams A may be defined to include a first portion A' and a second portion A". In this embodiment, the illumination component 11 is an ultra high pressure (UHP)

lamp for example, and the high-lumen light beams A generated by a wick of the illumination component 11 is focused by a semicircular cup-shaped reflecting surface. Referring to FIG. 2 together, the light beams A are adjusted to be focused onto the color wheel 15 exactly, and the boundaries of the light beams A define a cone angle θ". The focusing capability of the illumination component 11 (i.e., the size of the cone angle θ") is determined depending on the design specifications of the illumination component 11. Generally speaking, the cone angle θ41 of the illumination component 11 is usually about from 30 degrees to 60 degrees.

The filter component 13 is disposed between the illumination component 11 and the color wheel 15, and is defined with a normal direction 131. Generally speaking, the filter component 13 is disposed perpendicular to the first axis 111; i.e., the normal direction 131 of the filter component 13 is in parallel with the first axis 111. However, in this embodiment, the normal direction 131 of the filter component 13 is preferably deflected from the first axis 111; i.e., the normal direction 131 and the horizontal direction include an angle θ therebetween so that the light beams A provided by the illumination component 11 are projected onto the color wheel 15 after passing through the filter component 13. In this embodiment, the filter component 13 may be a UV-IR filter.

Referring further to FIG. 2 illustrated a partially enlarged schematic view of the light source system 1 of this embodiment. The arrangement of the color wheel 15 with respect to the first axis 111 is clearly shown in FIG. 2. The color wheel 15 may define a second axis 151, and rotates about the second axis 151. The second axis 151 is deflected from the first axis 111 by an angle θ'. The angle θ' is at least half of the cone angle θ", i.e., greater than or at least equal to half of the cone angle θ". Preferably, the angle θ' is from 15 degrees to 30 degrees, and may be adjusted depending on the cone angle θ" of the illumination component 11. In this way, when the light beams A provided by the illumination component 11 are substantially projected towards the first axis 111 and focused onto the color wheel 15, the first portion A' of the light beams A (typically a majority proportion of the light beams A) pass through the color wheel 15. As the color wheel 15 rotates at a high speed, the first portion A' of the light beams A will be formed into light beams of the three primary colors for subsequent use. In addition, the second portion A" of the light beams A (typically a minority proportion of the light beams A) cannot pass through the color wheel 15 but are reflected by the color wheel 15. One feature of the present invention is that by deflecting the second axis 151 of the color wheel 15 from the first axis 111 by an angle θ', the second portion A" (i.e., the small proportion) reflected by the color wheel 15 will not be reflected back to the illumination component 11 but will be projected outwards away from the first axis 111.

The light uniformization module 17 is disposed on the first axis 111 and receives the first portion A' of the light beams A that have passed through the color wheel 15 so that the first portion A' of the light beams A are uniformly projected in parallel with the first axis 111. In this embodiment, the light uniformization module 17 sequentially comprises a collimator 171 and a fly eyes lens 173. The collimator 171 regulates the first portion A' of the light beams A into parallel light beams, and then, the fly eyes lens 173 uniformizes the parallel light beams. Through the combination of the collimator 171 and the fly eyes lens 173, the overall volume can be effectively reduced while a superior uniformization effect can still be obtained.

Hereinafter, the operating mechanism of the light source system 1 of this embodiment will be described in detail. When the light beams A emitted by the illumination component 11 pass through the filter component 13 and are focused to the color wheel 15, the color wheel 15 allows the first portion A' of the light beams A to pass therethrough. Then, the first portion A' of the light beams A pass into the light uniformization module 17 for uniformization and are then projected outwards in parallel with the first axis 111 to be provided to the imaging system 5 for imaging.

When the light beams A emitted by the illumination component 11 pass through the filter component 13 and are focused to the color wheel 15, a portion of the light beams A will be projected as the second portion A" in a direction opposite to the traveling direction of the first portion A' of the light beams A. Because the second axis 151 of the color wheel 15 is deflected from the first axis 111 of the illumination component 11 by an angle, the second portion A" will travel in a direction deflected from the illumination component 11 or from the first axis 111 whether it passes through the filter component 13 again or not.

Figure 3:
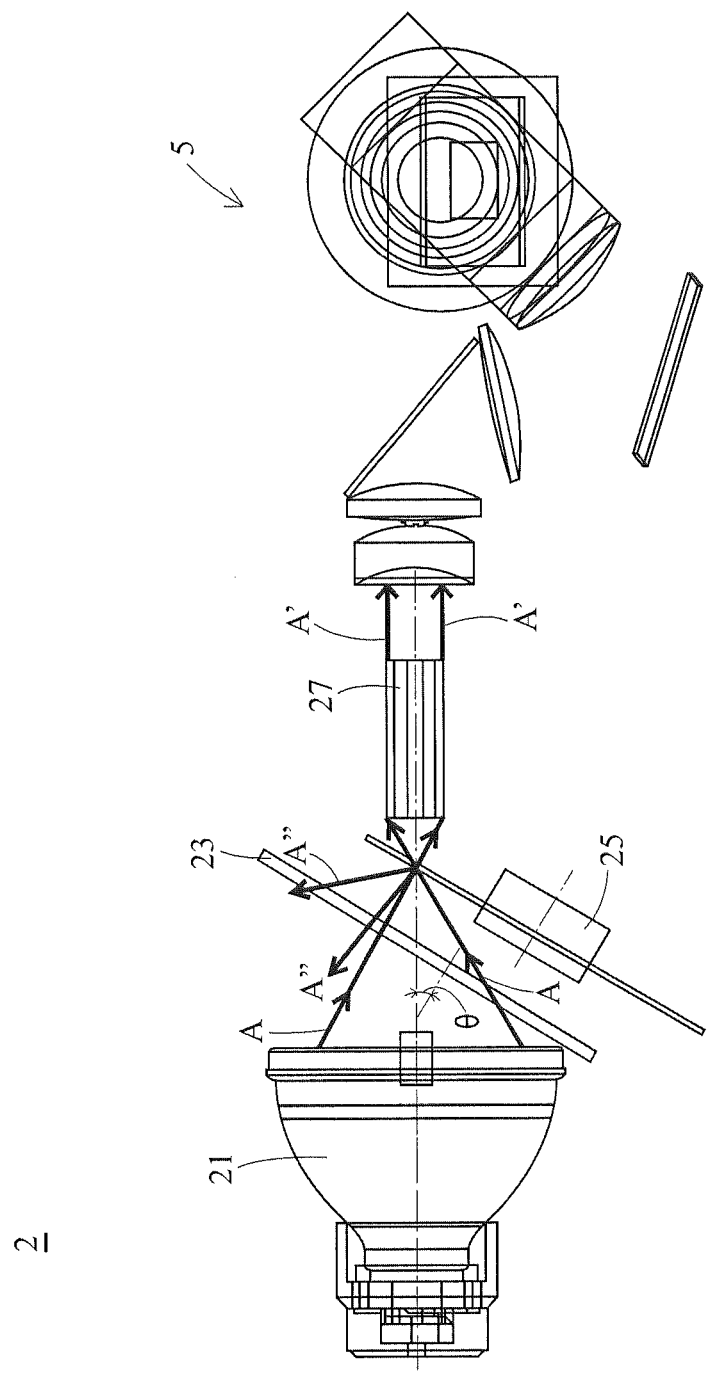
FIG. 3 is a schematic view of a light source system according to the second embodiment of the present invention.

Other similar embodiments may also be devised by people skilled in the art according to the first embodiment. For example, Referring to FIG. 3 illustrated a light source system 2 of a second embodiment. The light source system 2 according to the second embodiment of the present invention comprises an illumination component 21, a filter component 23, a color wheel 25 and a light uniformization module 27. The components of the second embodiment are roughly similar to those of the first embodiment, so the following description will only focus on the differences between the light source system 2 and the light source system 1 while similarities therebetween will be described only briefly or omitted altogether.

The light source system 2 of this embodiment is also for use in a projection device, and the projection device further comprises an imaging system 5. The light source system 2 of this embodiment is substantially the same as that of the previous embodiment but mainly differs in that the collimator 171 and the fly eyes lens 173 adopted in the light uniformization module 17 of the first embodiment are replaced with a light tunnel or a light integration rod in this embodiment, thereby, achieving a uniform effect; and accordingly, use of these elements may be chosen or combined by a designer in consideration of practical requirements and limitations in cost or volume. In addition, the positions of and operational relationships among the other components are all the same as those in the first embodiment, and thus, will not be further described herein.

According to the above descriptions, by deflecting the color wheel by an angle in the present invention, a portion of light beams that fail to pass through the color wheel but are reflected will be projected to a region outside the bulb. This can prevent the bulb from long-term exposure to the reflected portion of light beams and, thus, can effectively prolong the service life of the bulb.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:
1. A light source system, comprising:
an illumination component disposed on a first axis to provide light beams;

a color wheel defining a second axis to rotate thereabout, wherein the second axis deflects from the first axis by an angle, and a first portion of the light beams travels through the color wheel and a second portion of the light beams reflects from the color wheel and departs from the first axis after the light beams provided from the illumination component focus onto the color wheel; and a light uniformization module disposed on the first axis and located behind the color wheel, wherein the light uniformization module receives the first portion of the light beams that have traveled through the color wheel and then uniformly projecting the first portion of the light beams out along the first axis without reflection.

2. The light source system as claimed in claim 1, wherein the light beams provided from the illumination component define a cone angle when focusing at the first axis, and the angle at which the second axis deflects from the first axis is at least a half of the cone angle.

3. The light source system as claimed in claim 2, wherein the angle at which the second axis deflects from the first axis is from 15 degrees to 30 degrees.

4. The light source system as claimed in claim 1, further comprising a filter component disposed between the illumination component and the color wheel, with the light beams provided from the illumination component being projected to the color wheel through the filter component.

5. The light source system as claimed in claim 4, wherein the filter component is defined with a normal direction deflected from the first axis.

6. The light source system as claimed in claim 4, wherein the filter component is a UV-IR filter.

7. The light source system as claimed in claim 1, wherein the light uniformization module comprises a collimator and a fly eyes lens.

8. The light source system as claimed in claim 7, wherein the collimator regulates the first portion of the light beams into parallel light beams, and the fly eyes lens uniformizes the parallel light beams.

9. The light source system as claimed in claim 1, wherein the light uniformization module is a light tunnel or a light integration rod.

\* \* \* \* \*